(No Model.)

W. P. PORTER.
MUCK BAR CRADLE.

No. 267,456. Patented Nov. 14, 1882.

Witnesses
W. B. Corwin
L. C. Fitler

Inventor
William P. Porter
by his attys
Bakewell & Kerr

UNITED STATES PATENT OFFICE.

WILLIAM P. PORTER, OF ALLEGHENY, PENNSYLVANIA.

MUCK-BAR CRADLE.

SPECIFICATION forming part of Letters Patent No. 267,456, dated November 14, 1882.

Application filed October 11, 1882. (No model.)

*To all whom it may concern:*

Be it known that I, WILLIAM P. PORTER, of Allegheny city, in the county of Allegheny and State of Pennsylvania, have invented a new and useful Improvement in Muck-Bar Cradles; and I do hereby declare the following to be a full, clear, and exact description thereof.

Muck-bar cradles are used in iron-mills for the purpose of conveying and weighing muck-bars after they come from the furnace. Heretofore they have been made with a solid frame and immovable curved arms. When a heat of iron is to be weighed the bars are placed in the cradle, conveyed by the usual means to the scales, and weighed. It has been customary to weigh each heat when completed and after the bars have become sufficiently cool. Labor and expense have attended the handling of the bars with the old form of cradle, as they had to be lifted out of the arms of the cradle after being weighed. By my improvement I am enabled to discharge them automatically, and thus save the second handling.

To enable others skilled in the art to make and use my invention, I will now describe it by reference to the accompanying drawings, in which—

Figure 1:
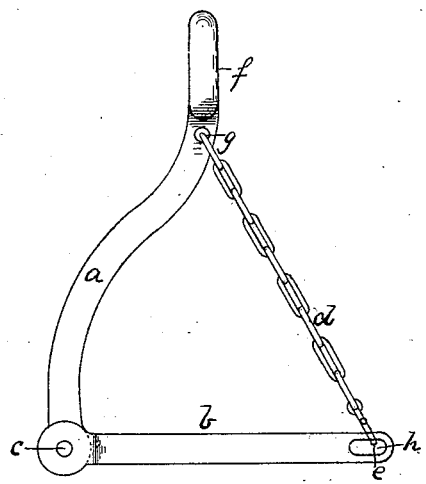
Figure 2:
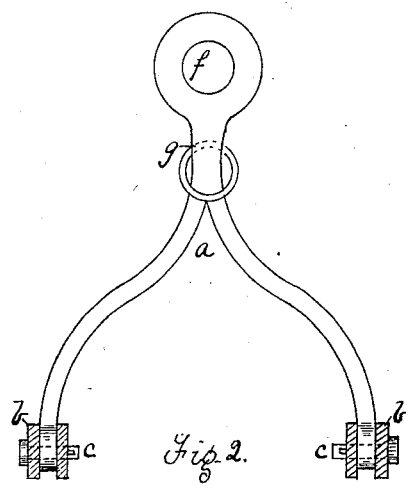
Figure 3:
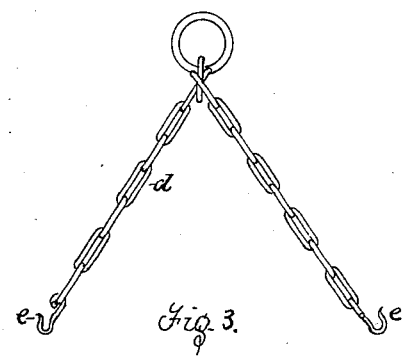

Figure 1 is a side view. Fig. 2 is a front view of the frame. Fig. 3 is a view of the chain which is used for sustaining the movable arms.

Like letters of reference indicate like parts in each.

I make a frame, $a$, of iron, preferably in bar form, which frame has a solid stock, in which is formed the eye or hole $f$ for suspending the cradle. Below the eye $f$ the frame is bifurcated, forming two parts, $a'$. In the lower ends of the furcations $a'$ are eyes, through which bolts or pins $c$ are passed. Pivoted to the bolts or pins $c$ are bars $b$, in the ends of which are holes $h$. Secured to the frame $a$, in the hole $g$, is a chain, $d$, the ends of which are fitted with hooks $e$. The chain is sufficiently long to sustain the bars $b$ in a horizontal position when the hooks $e$ are inserted into the holes $h$.

My improved cradle is used in the following way: The chain $d$ is unhooked from the bars $h$, and the latter placed upon the floor near the furnace. The puddle-bars are placed at right angles upon the bars until the load is completed. Then the frame $a$ is turned up back of the bars and brought forward until the hooks $e$ can be inserted into the holes $h$. Then the conveying and suspension device is attached to the cradle by means of the eye $f$, and the cradle, with its load, is raised on the steelyard or taken to the scales and weighed. The load of puddle-bars is then deposited in any desired position by simply bringing the cradle over the place and knocking the hooks out of the sustaining-bars. The bars $b$, being then unsupported at the forward end, turn freely on the pivots $c$, allowing the load of puddle-bars to slide off. If, however, the cradle is sitting on the floor, the discharge may be effected by knocking out the hooks $e$ and then raising the cradle until the load slides off.

The advantages arising from my improved cradle consist in the saving of time and labor it effects in the unloading of puddle-bars in the operations of moving, weighing, and shipping them.

Instead of the chains $d$, I may use bars pivoted to the frame $a$ and having lateral hooks, which take under the outer ends of the bars $b$.

This device may be used for the weighing, conveying, and shipping of various forms of iron in the mill, especially in connection with the shears in shearing rod-iron to length. I design to use it for general purposes in rolling.

What I claim as my invention, and desire to secure by Letters Patent, is—

1. The combination of the frame, the pivoted arms, and sustaining chains or bars, substantially as and for the purposes described.

2. A muck-bar cradle having pivoted sustaining-arms, substantially as and for the purposes described.

In testimony whereof I have hereunto set my hand this 9th day of October, A. D. 1882.

WILLIAM P. PORTER.

Witnesses:
W. B. CORWIN,
T. B. KERR.